(12) United States Patent
Strand et al.

(10) Patent No.: US 9,985,313 B2
(45) Date of Patent: May 29, 2018

(54) SOLID STATE ELECTROLYTE AND ELECTRODE COMPOSITIONS

(71) Applicant: Wildcat Discovery Technologies, Inc., San Diego, CA (US)

(72) Inventors: Deidre Strand, San Diego, CA (US); Marissa Caldwell, San Diego, CA (US)

(73) Assignee: WILDCAT DISCOVERY TECHNOLOGIES, INC., San Diego, CA (US)

(*) Notice: Subject to any disclaimer, the term of this patent is extended or adjusted under 35 U.S.C. 154(b) by 0 days. days.

(21) Appl. No.: 14/584,841

(22) Filed: Dec. 29, 2014

(65) Prior Publication Data

US 2015/0188187 A1  Jul. 2, 2015

Related U.S. Application Data

(60) Provisional application No. 61/923,135, filed on Jan. 2, 2014.

(51) Int. Cl.
   *H01M 10/056* (2010.01)
   *H01M 4/62* (2006.01)
   *H01M 10/0525* (2010.01)

(52) U.S. Cl.
   CPC ..... *H01M 10/056* (2013.01); *H01M 10/0525* (2013.01); *H01M 2300/0068* (2013.01); *H01M 2300/0082* (2013.01); *H01M 2300/0088* (2013.01)

(58) Field of Classification Search
   CPC ........ H01M 4/60; H01M 4/362–4/366; H01M 4/5825; H01M 4/602; H01M 4/604; H01M 4/62; H01M 4/621; H01M 10/056

USPC .......................................... 429/212–217, 317
See application file for complete search history.

(56) References Cited

U.S. PATENT DOCUMENTS

| | | | |
|---|---|---|---|
| 4,722,877 A * | 2/1988 | Sammells | H01M 4/131 429/231.5 |
| 5,599,355 A | 2/1997 | Nagasubramanian et al. | |
| 2002/0197535 A1* | 12/2002 | Dudley | H01M 2/08 429/246 |
| 2005/0132562 A1* | 6/2005 | Saito | H01M 4/0404 29/623.5 |
| 2008/0292963 A1* | 11/2008 | Sato | H01M 4/667 429/218.1 |
| 2008/0318133 A1* | 12/2008 | Matsuyama | H01M 4/13 429/300 |

(Continued)

FOREIGN PATENT DOCUMENTS

WO   1997049106 A1   12/1997

OTHER PUBLICATIONS

Abouimrane, A., et al., "Solid Electrolyte Based on Succinonitrile and LiBOB Interface Stability and Application in Lithium Batteries", Journal of the Electrochemical Society, 154 (11) A1031-A1034 (2007).

(Continued)

*Primary Examiner* — James Lee
(74) *Attorney, Agent, or Firm* — Corridor Law Group, P.C.

(57) ABSTRACT

A lithium ion battery having an anode, a solid electrolyte, and a cathode. The cathode includes an electrode active material, a first lithium salt, and a polymer material. The solid electrolyte can include a second lithium salt. The solid electrolyte can include a ceramic material, a lithium salt, and a polymer material.

8 Claims, 6 Drawing Sheets

(56) References Cited

U.S. PATENT DOCUMENTS

2009/0191462 A1* 7/2009 Matsui .................... C01B 31/04
                                                      429/231.8
2011/0177398 A1* 7/2011 Affinito et al. ............... 429/325
2013/0026409 A1  1/2013 Baker et al.

OTHER PUBLICATIONS

Croce, F., et al., "Nanocomposite, PEO-LiBOB Polymer Electrolytes for Low Temperature, Lithium Rechargeable Batteries", Journal of New Materials for Electrochemical Systems 9, 3-9 (2006).
Egashira, Minato, et al., "Effects of the Surface Treatment of the Al2O3 Filler on the Lithium Electrode/Solid Polymer Electrolyte Interface Properties", Electrochimica Acta 52 (2006) 1082-1086.
Ghosh, Ayan, et al., "Block Copolymer Solid Battery Electrolyte with High Li-Ion Transference Number", Journal of the Electrochemical Society, 157 (7) A846-A849 (2010).
Sumathipala, H. H., et al., "High Performance PEO-based Polymer Electrolytes and their Application in Rechargeable Lithium Polymer Batteries", Ionics (2007) 13:281-286.
Teran, Alexander A., et al., "Effect of Molecular Weight on Conductivity of Polymer Electrolytes", Solid State Ionics 203 (2011) 18-21.
Wang, Congxiao, et al., "All Solid-State Li/LixMnO2 Polymer Battery Using Ceramic Modified Polymer Electrolytes", Journal of the Electrochemical Society, 149 (8) A967-A972 (2002).
Zhang, Ding, et al., "Electrochemical Stability of Lithium bis(oxatlato) borate Containing Solid Polymer Electrolyte for Lithium Ion Batteries", Journal of Power Sources 196 (2011) 10120-10125.

\* cited by examiner

SOLID STATE ELECTROLYTE AND ELECTRODE COMPOSITIONS

CROSS REFERENCE TO RELATED APPLICATIONS

This application claims priority to and the benefit of U.S. Provisional Application No. 61/923,135 filed Jan. 2, 2014 entitled "Solid State Electrolyte and Electrode Compositions," which application is incorporated herein by reference in its entirety.

BACKGROUND OF THE INVENTION

The present invention is in the field of battery technology and, more particularly, in the area of solid polymeric materials and composites for use in electrodes and electrolytes in electrochemical cells.

Conventional lithium ion batteries include a positive electrode (or cathode as used herein), a negative electrode (or anode as used herein), an electrolyte, and, frequently, a separator. The electrolyte typically includes a liquid component that facilitates lithium ion transport and, in particular, enables ion penetration into the electrode materials.

In contrast, so-called solid-state lithium ion batteries do not include liquid in their principal battery components. Solid-state batteries can have certain advantages over liquid electrolyte batteries, such as improvements in safety because the liquids used in liquid electrolytes are often volatile organic solvents. Solid-state batteries offer a wider range of packaging configurations because a liquid-tight seal is not necessary as it is with liquid electrolytes.

Further, solid state batteries can use lithium metal as the anode, thereby dramatically increasing the energy density of the battery as compared to the carbon-based anodes typically used in liquid electrolyte lithium ion batteries. With repeated cycling, lithium metal can form dendrites, which can penetrate a conventional porous separator and result in electrical shorting and runaway thermal reactions. This risk is mitigated through the use of a solid nonporous polymer electrolyte.

The electrolyte material in a solid-state lithium ion battery can be a polymer. In particular, poly(ethylene oxide) ("PEO") can be used in forming solid polymer electrolytes. PEO has the ability to conduct lithium ions as positive lithium ions are solubilized and/or complexed by the ethylene oxide groups on the polymer chain. Solid electrolytes formed from PEO can have crystalline and amorphous regions, and it is believed that lithium ions move preferentially through the amorphous portion of the PEO material. In general, ionic conductivities on the order of $1 \times 10^{-6}$ S/cm to $1 \times 10^{-5}$ S/cm at room temperature can be obtained with variations on PEO based electrolyte formulations. The electrolyte is typically formulated by adding a lithium ion salt to the PEO in advance of building the battery, which is a formulation process similar to liquid electrolytes.

However, solid-state batteries have not achieved widespread adoption because of practical limitations. For example, while polymeric solid-state electrolyte materials like PEO are capable of conducting lithium ions, their ionic conductivities are inadequate for practical power performance. Successful solid-state batteries require thin film structures, which reduce energy density, and thus have limited utility.

Further, solid-state batteries tend to have a substantial amount or degrees of interfaces among the different solid components of the battery. The presence of such interfaces can limit lithium ion transport and impede battery performance. Interfaces can occur (i) between the domains of active material in the electrode and the polymeric binder, (ii) between the cathode and the solid electrolyte, and (iii) between the solid electrolyte and the anode structure. Poor lithium ion transport across these interfaces results in high impedance in batteries and a low capacity on charge or discharge.

Research on solid-state electrolyte materials tends to focus primarily on the composition of the materials used to form the electrolyte to increase ion conductivity. However, less attention has been paid to solving the problem of increased impedance due to conductivity losses at interfaces or addressing the transport of ions through the electrode structures.

For example, U.S. Patent Publication 2013/0026409 discloses a composite solid electrolyte with a glass or glass-ceramic inclusion and an ionically conductive polymer. However, this solid electrolyte requires a redox active additive. As another example, U.S. Pat. No. 5,599,355 discloses a method of forming a composite solid electrolyte with a polymer, salt, and an inorganic particle (such as alumina). The particles are reinforcing filler for solid electrolyte and do not transport lithium. As yet another example, U.S. Pat. No. 5,599,355 discloses a composite solid state electrolyte containing a triflate salt, PEO, and a lightweight oxide filler material. Again, the oxide filler is not a lithium ion conductor or intercalation compound.

More generally, ionically conductive polymers like PEO have been disclosed with the use of a lithium salt as the source of lithium ions in the solid electrolyte. For example, Teran et al., Solid State Ionics (2011) 18-21; Sumathipala et al., Ionics (2007) 13: 281-286; Abouimrane et al., JECS 154(11) A1031-A1034 (2007); Wang et al., JECS, 149(8) A967-A972 (2002); and Egashira et al., Electrochimica Acta 52 (2006) 1082-1086 each disclose different solid electrolyte formulations with PEO and a lithium salt as the source for lithium ions. Still further the last two references (Wang et al. and Egashira et al.) each disclose inorganic nanoparticles that are believed to improve the ionic conductivity of the PEO film by preventing/disrupting polymer crystallinity. However, none of these formulations address the limitations of solid electrolytes and provide the performance improvements seen in the embodiments disclosed below.

BRIEF SUMMARY OF THE INVENTION

Embodiments of the present invention provide comparatively high capacity and low impedance in solid-state batteries, that is, batteries in which the electrodes and electrolyte are formed from solid materials and are substantially free of liquid components.

Embodiments of the present invention provide cathode materials and composites formed from certain lithium salts, for example lithium bis(oxalato)borate or lithium bis(trifluoromethanesulfonyl)imide, used in combination with poly (ethylene oxide), to improve capacity in a solid-state battery.

Embodiments of the present invention provide electrolyte materials formed from certain lithium salts, for example lithium bis(oxalato)borate or lithium bis(trifluoromethanesulfonyl)imide, used in combination with PEO, to decrease impedance in a solid-state battery.

Embodiments of the present invention provide electrolyte materials formed from certain lithium salts, for example lithium bis(oxalato)borate or lithium bis(trifluoromethanesulfonyl)imide, used in combination with PEO, to decrease the impedance of polymer/ceramic composite solid-state electrolytes.

Embodiments of the present invention include a lithium ion battery having an anode, a solid electrolyte, and a cathode. The cathode comprises an electrode active material, a first lithium salt, and a polymer material. The solid electrolyte can include a second lithium salt.

Embodiments of the present invention include a lithium ion battery having an anode, a solid electrolyte, and a cathode. The solid electrolyte comprises a ceramic material, a first lithium salt, and a polymer material. The solid electrolyte can include a second lithium salt.

DETAILED DESCRIPTION OF THE INVENTION

The following definitions apply to some of the aspects described with respect to some embodiments of the invention. These definitions may likewise be expanded upon herein. Each term is further explained and exemplified throughout the description, figures, and examples. Any interpretation of the terms in this description should take into account the full description, figures, and examples presented herein.

The singular terms "a," "an," and "the" include the plural unless the context clearly dictates otherwise. Thus, for example, reference to an object can include multiple objects unless the context clearly dictates otherwise.

The terms "substantially" and "substantial" refer to a considerable degree or extent. When used in conjunction with an event or circumstance, the terms can refer to instances in which the event or circumstance occurs precisely as well as instances in which the event or circumstance occurs to a close approximation, such as accounting for typical tolerance levels or variability of the embodiments described herein.

The term "about" refers to the range of values approximately near the given value in order to account for typical tolerance levels, measurement precision, or other variability of the embodiments described herein.

A "C-rate" refers to either (depending on context) the discharge current as a fraction or multiple relative to a "1 C" current value under which a battery (in a substantially fully charged state) would substantially fully discharge in one hour, or the charge current as a fraction or multiple relative to a "1 C" current value under which the battery (in a substantially fully discharged state) would substantially fully charge in one hour.

Ranges presented herein are inclusive of their endpoints. Thus, for example, the range 1 to 3 includes the values 1 and 3 as well as the intermediate values.

Solid-state batteries can be formed using polymeric materials with ion conducting properties. The polymeric materials can be used in the solid electrolyte. The polymer should have suitable mechanical properties and thermal stability, in addition to the desired level of ionic conductivity, and specifically lithium ion conductivity. As with other applications using polymeric materials, the properties of the solid structure can be influenced by (i) the choice of polymer, (ii) the molecular weight of the polymer, (iii) the polydispersity of the polymer, (iv) the processing conditions, and (v) the presence of additives.

Poly(ethylene oxide) ("PEO") is a suitable polymer for use in lithium ion solid-state batteries. PEO is a commodity polymer available in a variety of molecular weights. PEO can range from very short oligomers of about 300 g/mol (or 300 Da) to very high molecular weights of 10,000,000 g/mol (or 10,000 kDa). At molecular weights of 20 kDa and below, PEO is typically referred to as poly(ethylene glycol) or PEG. PEO has been used as a separator in conventional liquid electrolyte systems and, as described above, as a component in a thin film solid electrolyte.

PEO processed into a structure can have both crystalline and amorphous domains. Ionic conductivity happens more readily in the amorphous domains and, therefore, processing conditions that decrease crystalline domain size and/or the overall amount of crystallinity are preferred. Some research has used carbonate solvents, such as ethylene carbonate, dimethyl carbonate, or diethyl carbonate, as plasticizers to improve ionic transport and reduce interfacial impedance. However, this involves the addition of a volatile, flammable liquid to the battery and negates much of the safety benefits brought by a solid-state electrolyte. In PEO systems, PEG can be added to achieve the desired processing properties, such as a preferred solution viscosity, film modulus, or film glass transition temperature.

While PEO is discussed herein as a preferred polymeric material, it is understood that other polymers with equivalent chemical, electrochemical, mechanical, and/or thermal properties can be used in place of or in addition to PEO and/or PEO/PEG mixtures. Further, copolymers that include PEO, PEG, or PEO-like polymers in at least one segment of the copolymer can be suitable for certain embodiments described herein. Thus, the embodiments described herein that refer to PEO or PEO/PEG are understood to encompass other such polymeric and co-polymeric materials.

According to some aspects discussed herein, certain lithium salts added to polymeric materials improve the performance of solid-state batteries. Specifically, a lithium salt concentration in a PEO such that the ether oxygen (EO) to lithium ion ratio is about 3.1 (that is, [EO]:[Li$^+$]=3:1) results in maximum ionic conductivity in the PEO films. In embodiments disclosed herein, the [EO]:[Li$^+$] ratio varies from about 2:1 to about 4:1, but is preferably about 3:1 to achieve the desired conductivity. Mechanical properties of the lithium salt/polymer composites are controlled by the molecular weight of the PEO, the ratio of PEO/PEG, and the process used to make the film (e.g., the type and nature of the solvent used for casting).

Suitable lithium salts include, but are not limited to, lithium triflate (LiCF$_3$SO$_3$), lithium tetrafluoroborate (LiBF$_4$), lithium hexafluorophosphate (LiPF$_6$), lithium hexafluoroarsenate (LiAsF$_6$), lithium bromide (LiBr), lithium chlorate (LiClO$_3$), lithium nitrate (LiNO$_3$), lithium bis(oxalato)borate (LiB(C$_2$O$_4$)$_2$) (also referred to herein as "LiBOB"), lithium difluoro(oxalato)borate (LiC$_2$O$_4$BF$_2$), lithium metaborate (Li$_2$B$_4$O$_7$), lithium bis(trifluoromethanesulfonyl)imide (CF$_3$SO$_2$NLiSO$_2$CF$_3$) (also referred to herein as "LiTFSI"), and combinations thereof. In preferred embodiments, the lithium salt is lithium triflate, LiBOB, LiTFSI, or combinations thereof.

As discussed above, additives can be used to favorably influence the properties of the final polymer structure. The addition of lithium salts to PEO can result in favorable thermal properties for the resulting mixture of salt and polymer.

For example, Table 1 provides the results of Differential Scanning Calorimetry testing of various salt and polymer combinations. The molecular weight (MW) of the PEO is provided in the first column in kiloDaltons. The identity of the lithium salt additive is provided in the second column. Note that the first row is a polymer formulation without any added lithium salt. The ratio of PEO:PEG:Salt (weight %) is provided in the third column. The melt onset temperature (T$_m$ onset), and peak melt temperature (T$_m$ peak) are provided in the final two columns. Table 1 demonstrates that the ratio of PEO:PEG was about 4.26 and was the same for all salt loading levels. Also, the 4.26 PEO:PEG ratio was maintained for the different molecular weights of PEO used in this testing. Thus, the thermal differences among the tested formulations can be attributed to the presence of the salt.

TABLE 1

Thermal Data for PEO/Salt Combinations

| PEO MW (kDa) | Salt | Formulation PEO:PEG:Salt (weight %) | T$_m$ (onset) (° C.) | T$_m$ (peak) (° C.) |
| --- | --- | --- | --- | --- |
| 7,000 | None | 81:19:0 | 59 | 67 |
| 7,000 | LiBOB | 72.9:17.1:10 | 53 | 64 |
| 7,000 | LiBOB | 64.8:15.2:20 | 34 | 54 |
| 8,000 | LiBOB | 64.8:15.2:20 | 32 | 55 |
| 7,000 | Li Triflate | 64.8:15.2:20 | 57 | 65 |
| 8,000 | Li Triflate | 64.8:15.2:20 | 58 | 66 |

The addition of Li triflate to the PEO/PEG mixture did not have a significant effect on the thermal properties of the PEO/PEG as compared to the control. That is, the values for the onset of the melting temperature and the peak melting temperature remained similar to the unloaded PEO/PEG regardless of the molecular weight of the PEO.

However, the addition of LiBOB salt to the PEO/PEG mixture resulted in a decrease in the onset of the melting temperature and a decrease in the peak melting temperature of the original polymer. Specifically, a 10% LiBOB loading level decreased the onset of the melting temperature and the peak melting temperature. A 20% LiBOB loading level further decreased the onset of the melting temperature and the peak melting temperature of the mixture. At a 20% LiBOB loading level and a slightly higher molecular weight PEO, the decrease versus control in the onset of the melting temperature and the peak melting temperature was maintained.

The decrease in the onset of the melting temperature and the peak melting temperature is consistent with the LiBOB acting as a solid plasticizer for the PEO/PEG mixture. Therefore, if the ionic conductivity in the polymer is increased due to the plasticization, no volatile or liquid plasticizer was actually required. As described in more detail below, the benefit of LiBOB in improving the cell capacity is observed for all the molecular weights of PEO tested.

Using the formulations of polymer and salt generally described above, electrolyte structures and electrode structures can be formed for lithium ion batteries. In certain aspects, solid electrolytes are formed from a polymer and a lithium salt. The inclusion of a lithium salt, such as those disclosed herein and their equivalents, can improve the performance of solid-state batteries by the mechanism disclosed herein and other equivalent mechanisms. For example, the inclusion of LiBOB or LiTFSI in a PEO/PEG mixture can increase the conductivity of lithium ions through a PEO/PEG structure and can reduce the interfacial impedance between the electrolyte structure and the electrode structure.

Figure 1A:
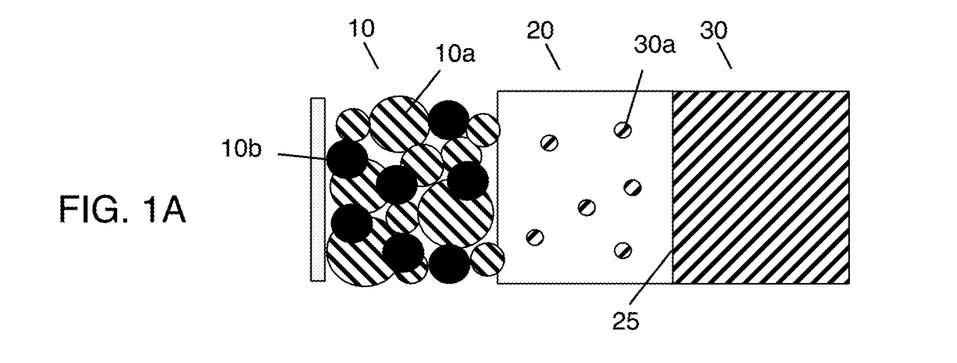
FIGS. 1A, 1B, and 1C illustrate schematic representations of cathode, electrolyte, and anode configurations according to certain embodiments of the invention.

FIG. 1A depicts a schematic representation of a solid-state battery. The cathode 10 includes domains of active material 10a and domains of conductive carbon 10b. A binder may also be present in the cathode 10 but is not pictured. The active material can be any active material or materials useful in a lithium ion battery, including the active materials in lithium metal oxides or layered oxides (e.g., Li(NiMnCo)O$_2$), lithium rich layered oxide compounds, lithium metal oxide spinel materials (e.g., LiMn$_2$O$_4$, LiNi$_{0.5}$Mn$_{1.5}$O$_4$), olivines (e.g., LiFePO$_4$, etc.). Active materials can also include compounds such as silver vanadium oxide (SVO), metal fluorides (e.g., CuF$_2$, FeF$_3$), and carbon fluoride (CF$_x$). More generally, the active materials for cathodes can include phosphates, fluorophosphates, fluorosulphates, silicates, spinels, and composite layered oxides.

In some embodiments, polymer/lithium salt materials and composites described herein are used in the formation of anodes. Appropriate active materials for use in such anodes include, but are not limited to, graphitic and non-graphitic carbons, silicon and silicon alloys, lithium tin oxide, other metal alloys, and combinations thereof.

In FIG. 1A, the solid electrolyte structure 20 is formed from any of the polymer/lithium salt formulations disclosed herein. The solid electrolyte structure 20 is depicted as a uniform and monolithic structure, but other configurations are possible. The anode 30 is depicted in FIG. 1A and can be a lithium metal anode, for example. The solid polymer electrolyte can include dispersions of nanoparticles 30a, which may be incorporated to improve ionic conductivity or mechanical properties.

The loading of the lithium salt in the polymeric material of solid electrolyte structure 20 provides improved lithium ion conduction as compared to an unloaded polymeric material. Further, lithium ion transport across the electrolyte/anode interface 25 can be enhanced by the lithium salt loaded solid electrolyte structure 20. The presence of the solid electrolyte structure 20 according to embodiments disclosed herein reduces the impedance in the battery and improves the battery capacity.

In certain aspects, cathodes for solid-state batteries are formed from an active material, a polymer, and a lithium salt combination. The combination of lithium salts and PEO (or PEO/PEG) can be incorporated in the cathode structure. The advantages of improving ion transport and decreasing interfacial impedance are also important within cathodes.

One of the benefits of liquid-containing batteries is that a liquid electrolyte can penetrate the porous space of a cathode and provide ion conduction paths. It is this benefit that perpetuates the use of volatile liquid organics despite their safety issues. A solid-state battery does not have liquid to facilitate ion transport from within the cathode material.

Figure 1B:
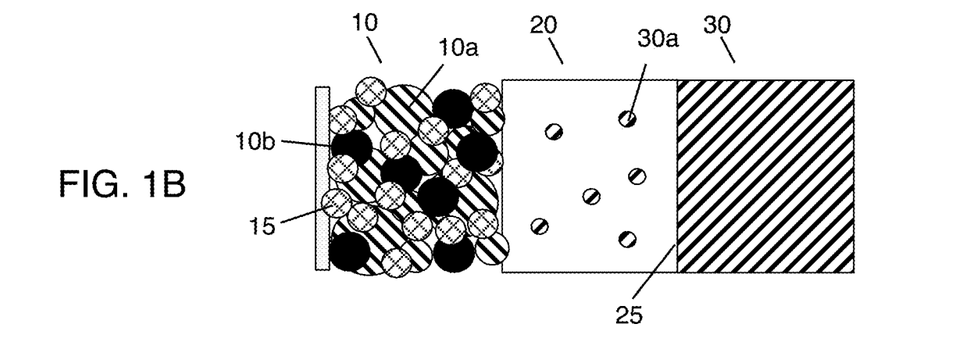

Advantageously, embodiments of the polymer/lithium salt formulations disclosed herein can be used as additives during the formation of cathodes. FIG. 1B depicts a schematic representation of a solid-state battery which has an anode 30, a solid electrolyte structure 20, and a electrolyte/anode interface 25 similar to that depicted in FIG. 1A. FIG. 1B depicts a cathode structure 10 that includes domains of active material 10a and domains of conductive carbon 10b. The cathode structure 10 further includes domains of a polymer/lithium salt formulation 15. While FIG. 1B depicts the components of cathode 10 as discrete domains, it is understood that processing steps (such as heating, dissolution, and/or pressure) can be used to create more intimate mixing of the cathode components. During such mixing, interfaces will be formed among the domains of the cathode. Advantageously, the polymer/lithium salt formulations can reduce the interfacial impedance in the cathode. Further, while the domains are depicted with a particle-type configuration, the domains can be in other configurations, including for example interpenetrating layers and/or films.

Further, FIG. 1B depicts domains of a polymer/lithium salt formulation 15 and the solid electrolyte structure 20 with a different pattern. This pattern difference indicates that the actual formulation of the polymer/salt for use in the cathode may be different from the formulation for use in the solid electrolyte. For example, parameters including (i) the molecular weight of the PEO, (ii) the ratio of PEO to PEG, (iii) the loading of salt; (iv) the choice of salt or salts; and (v) the polymer/salt formulation processing conditions can be varied and/or optimized for use in the cathode as compared to the parameters selected for use in the electrolyte.

In some aspects, solid state batteries according to embodiments herein can have no lithium salt additive loaded in the solid electrolyte if the cathode material includes polymer/lithium salt formulations. The additive lithium salt within the cathode can migrate out into the solid electrolyte over time and provide benefits such as increased capacity and decreased impedance to the overall battery. Still further, the salt in the solid electrolyte can be different from the salt in the polymer/salt formulation in the cathode. For example, lithium triflate can be used in the electrolyte (with a polymer such as PEO or PEO/PEG) and LiBOB or LiTFSI can be used in the cathode (with a polymer such as PEO or PEO/PEG).

Figure 1C:
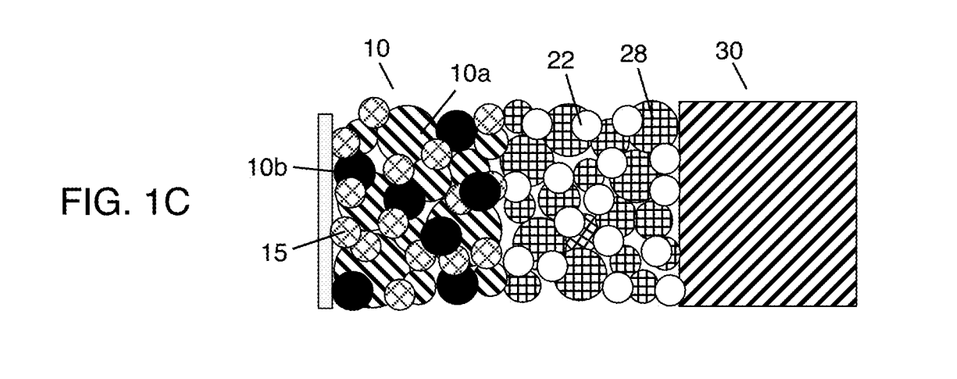

Embodiments of the polymer/lithium salt formulations disclosed herein can be used as additives during the formation of composite solid electrolytes. FIG. 1C depicts a schematic representation of a solid-state battery which has an anode 30 and a cathode 10 similar to that depicted in FIG. 1B. In FIG. 1C, the electrolyte is formed from a composite of domains of a polymer/lithium salt formulation 22 and domains of a lithium ion conducting ceramic 28. In some cases, the lithium ion conducting material can be a garnet material such as a cubic garnet phase $Li_{6.5}La_3Zr_{1.5}Ta_{0.5}O_{12}$ (LLZTO), sulfides such as $Li_{10}SnP_2S_{12}$ (LSPS) and $P_2S_5$—$Li_2S$ glass, lithium ion conducting glass ceramics (LIC-GC) such as $Li_{1+x+y}Al_xTi_{2-x}Si_yP_{3-y}O_{12}$, phosphates such as $Li_{1.3}Ti_{1.7}Al_{0.3}(PO_4)_3$ (LTAP) or $Li_2PO_2N$ (LiPON), or combinations thereof.

A general formula for garnet materials, which can be abbreviated as (LLMO), is:

$$Li_{3+x}La_{3-y}A_yM_2O_{12} \qquad (1)$$

where M can be a variety of different elements, including but not limited to, titanium (Ti), zirconium (Zr), niobium (Nb), tantalum (Ta), antimony (Sb), bismuth (Bi) and combinations thereof, and A can also be a variety of different elements, including but not limited to, barium (Ba). Generally, $x<=4$ and $y<=1$. It is intended that the garnet materials useful for embodiments disclosed herein include those presently known to be useful and those contemplated in future uses to be useful in lithium ion batteries.

As with the other solid electrolyte formulations disclosed herein, the polymer/lithium salt formulation can reduce interfacial impedance in systems like those schematically depicted in FIG. 1C.

The formulations disclosed above have been tested in various configurations. The lithium salt/polymer combinations are useful as components of cathode materials and solid-state electrolyte materials. As will be apparent from the example below, PEO/PEG/LiBOB and PEO/PEG/LiTFSI perform well in both the cathode and the solid electrolyte in enabling high cell capacity. Of course, other formulations can enable improvements in battery performance as compared to unloaded polymeric materials.

The following examples describe specific aspects of some embodiments of the invention to illustrate and provide a description for those of ordinary skill in the art. The examples should not be construed as limiting the invention, as the examples merely provide specific methodology useful in understanding and practicing some embodiments of the invention.

EXAMPLES

Preparation of solid electrolyte films. A solution of PEO, PEG, and the desired lithium salt or salts is prepared by weighing the desired ratios of solids, followed by addition of a solvent (such as acetonitrile). The solution is stirred aggressively overnight in an argon filled glove box (M-Braun, $O_2$ and humidity content <0.1 ppm). A film is cast from the slurry using a doctor blade onto a Teflon substrate, and is then air-dried. The film is annealed at 100 degrees C. under vacuum for 12 hours, and then cooled. A freestanding film can then be peeled from the substrate, and cut or punched to the appropriate size and shape. The punched films are dried at 60 degrees C. under vacuum for about an hour.

Preparation of Cathode Films.

A stock solution containing PEO (molecular weight can be chosen based on the desired properties of the finished structure), conductive carbon black, and an additive lithium salt (such as LiBOB) in desired ratios (such as those identified herein) is prepared in a solvent (such as benzonitrile) by stirring overnight. The PEO and LiBOB dissolve, while the carbon is suspended in the polymer/salt solution. The stock solution is then added to an $Ag_2V_4O_{11}$ ("SVO") cathode powder in the desired amount, and the resulting suspension is stirred overnight. The resulting slurry is then coated onto a current collector, and then dried at 60 degrees C. until substantially all of the solvent is evaporated. Films are then pressed to a desired density. The pressed cathode films are dried at 60 degrees C. under vacuum overnight prior to cell assembly.

Battery Cell Assembly.

Battery cells were formed in a high purity argon filled glove box (M-Braun, $O_2$ and humidity content <0.1 ppm). The silver-vanadium oxide ("SVO") cathode film described previously and a lithium metal anode electrode were used. The SVO/Li pairing is typical of a primary battery chemistry. Each battery cell includes the composite cathode film prepared as described above, a solid polymer electrolyte prepared as described above, and a lithium metal anode film. No liquid electrolyte components were added to the battery cell. Annealing of the stack of cathode/electrolyte films was done at 110 degrees C. on a hot plate for 1 hour prior to putting in the cell with lithium and crimping the cell together. All assembly was done under argon.

Example 1

Figure 2:
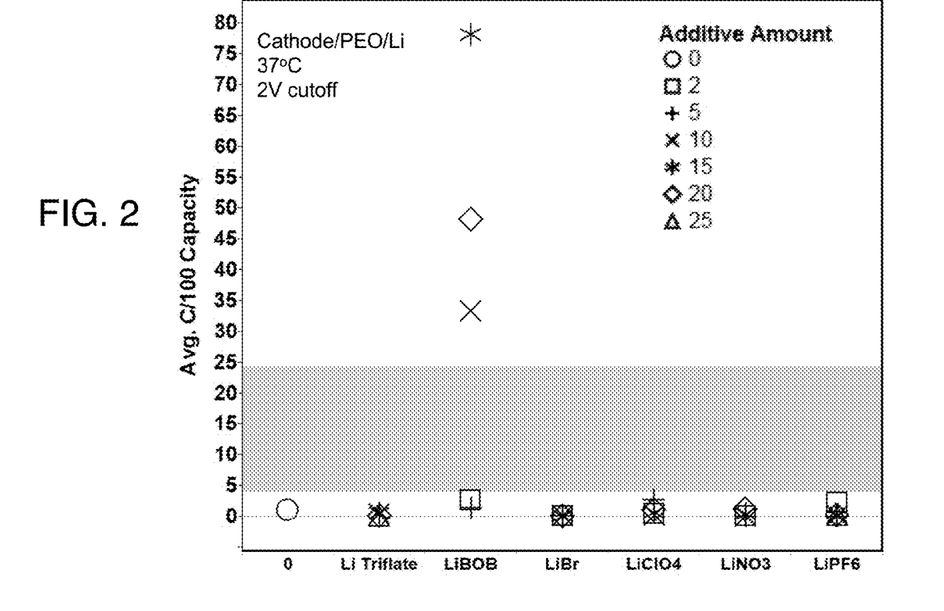
FIG. 2 illustrates improved capacity at a discharge rate of C/100 from cells containing composite cathodes films formed from a polymer/lithium salt formulation and a polymer/lithium salt solid electrolyte according to certain embodiments of the invention.
Figure 3:
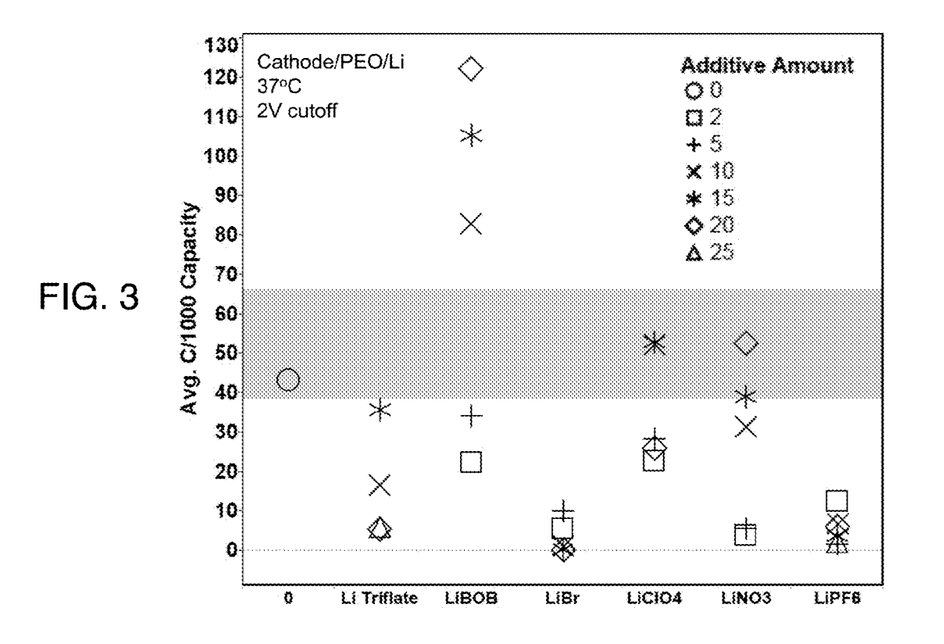
FIG. 3 illustrates improved capacity at a discharge rate of C/1000 from cells containing composite cathodes films formed from a polymer/lithium salt formulation and a polymer/lithium salt solid electrolyte according to certain embodiments of the invention.

After cell assembly, the cells were held at open current voltage for 12 hours at 37 degrees C. The cells were then held at 37 degrees C. and discharged at the desired C-rate to determine the capacity. FIG. 2 shows a comparison at C/100 for various salts formulated into the cathode slurry and FIG. 3 shows a comparison at C/1000. The bands in each of FIGS. 2 and 3 represent the standard deviation of the replicates of the control. All solid electrolytes in the cells contained lithium triflate. Thus, FIGS. 2 and 3 compare the presence of a given lithium salt/polymer formulation in the cathode material, with a single lithium salt/polymer formulation as the electrolyte. The cathodes in FIGS. 2 and 3 were unpressed, which is relevant because pressing cathodes prior to use will improve the eventual performance of the battery. The additive amounts are expressed as a percentage of the amount loaded into the polymeric material.

FIG. 2 demonstrates that at a discharge rate of C/100, LiBOB performs better than the other lithium salts and better than cathodes with no lithium salt. FIG. 2 shows results from cathodes containing LiBOB that yielded approximately 40-80 mAh/g (as compared to the theoretical capacity of 270 mAh/g). In combination, FIGS. 2 and 3 demonstrate that the capacity observed when LiBOB is incorporated into the cathode is dependent upon the discharge rate. FIG. 3 demonstrates that at a slower rate, C/1000, formulations containing no salt can yield about 30 mAh/g of capacity. FIG. 3 shows results from cathodes containing LiBOB that reach approximately 100 mAh/g.

Example 2

Figure 4:
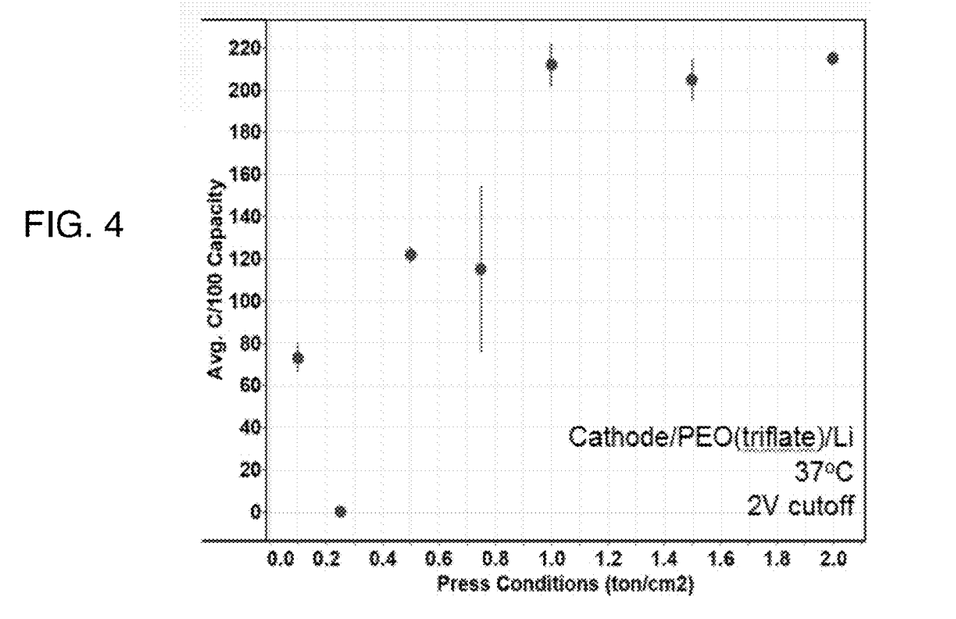
FIG. 4 illustrates improved capacity in cells containing pressed composite cathodes films formed from a polymer/lithium salt formulation and a polymer/lithium salt solid electrolyte according to certain embodiments of the invention.

After pressing the films at greater than 1 ton/cm$^2$, the C/100 capacity reaches 220 mAh/g, which is 81% of theoretical capacity, for composite cathodes that contain LiBOB, as depicted in FIG. 4. That is, in FIG. 4, the cathode is formed with LiBOB/PEO domains as described in the synthetic methods section above. The solid electrolyte is formed to include PEO/lithium triflate. The anode is based on lithium metal. At C/1000, 88% of the theoretical capacity of this electrochemical cell arrangement is demonstrated in testing. Similar results can be achieved when LiTFSI is used in the composite cathode.

Example 3

Figure 5:
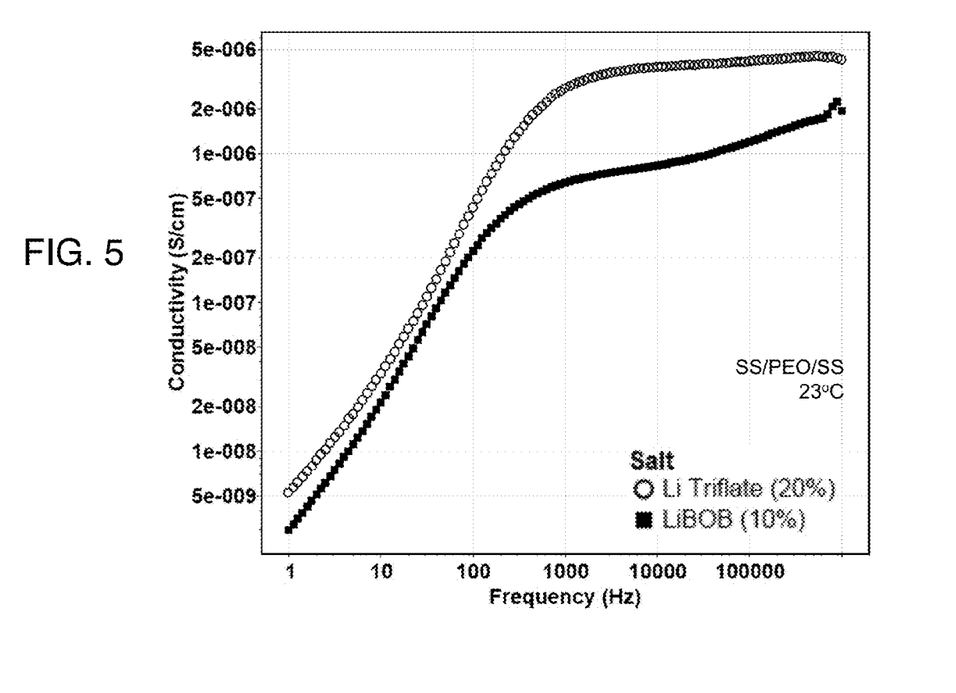
FIG. 5 illustrates the measured ionic conductivity of various polymer/lithium salt films according to certain embodiments of the invention.

Electrochemical impedance spectroscopy is used to determine the ionic conductivity of PEO/lithium salt films. A film with known thickness and area is placed between two polished stainless steel ("SS") disks, and an AC voltage (10 mV) is applied at varying frequencies. The resulting amplitude change and phase shift in the response is used to calculate ionic conductivity of the film. FIG. 5 shows the measured ionic conductivity of PEO/lithium salt films. The concentration of the LiBOB is different by half than that of the lithium triflate (10% by weight for LiBOB and 20% by weight for lithium triflate), but both films are similar in ionic conductivity. The incorporation of LiBOB or lithium triflate into the PEO does not result in significant changes in ionic conductivity of the film as measured in this test and depicted in FIG. 5.

Example 4

Figure 6A:
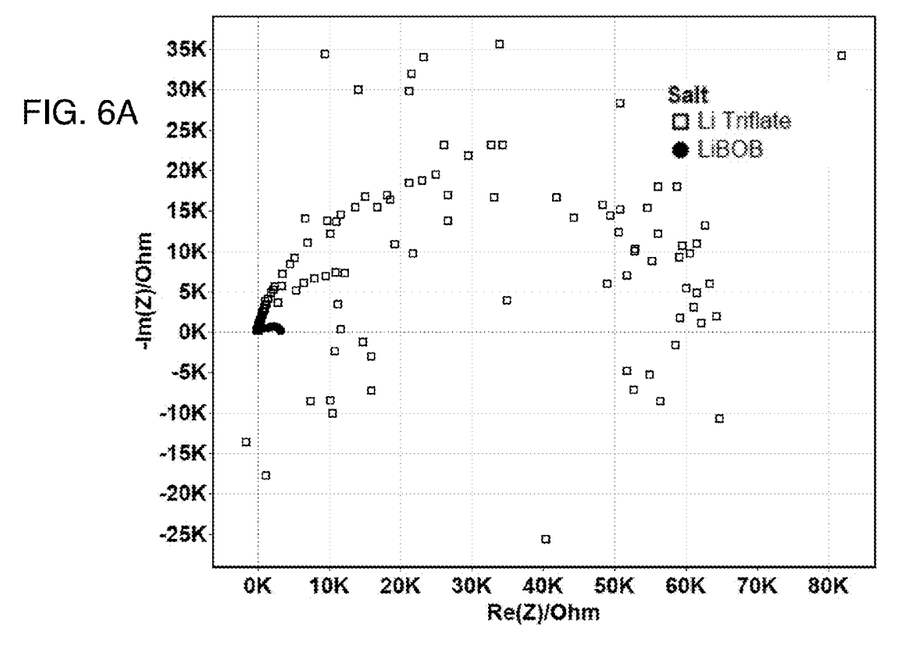
FIGS. 6A and 6B illustrate measurement of the impedance of films containing polymer/lithium salt formulations according to certain embodiments of the invention.
Figure 6B:
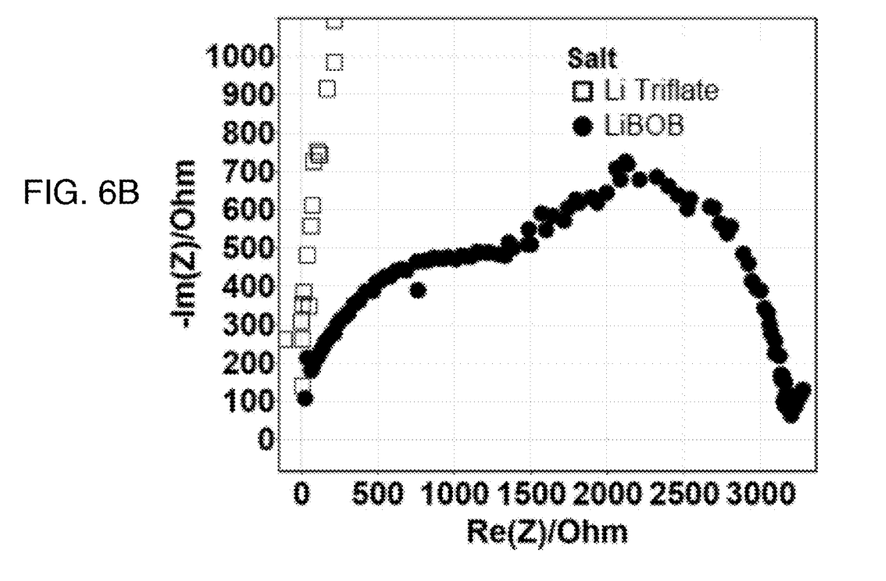

Electrochemical impedance spectroscopy is used to determine the ionic conductivity of PEO/lithium salt films placed between lithium substrates instead of the stainless steel disks of Example 3. The impedance is determined by where the data cross the x-axis. The impedance of films containing the lithium triflate is an order of magnitude higher than those containing LiBOB, as depicted in FIGS. 6A and 6B (where 6B is a magnified view of the data near the origin of the plot depicted in FIG. 6A). This data demonstrates that the interfacial impedance on lithium substrates is reduced for PEO containing LiBOB. Thus, while FIG. 5 confirmed that there was not a significant change in ionic conductivity when comparing LiBOB and lithium triflate, FIG. 6 shows that polymer/LiBOB formulations can improve the impedance performance of a cathode as compared to polymer/lithium triflate formulations.

Example 5

Figure 7A:
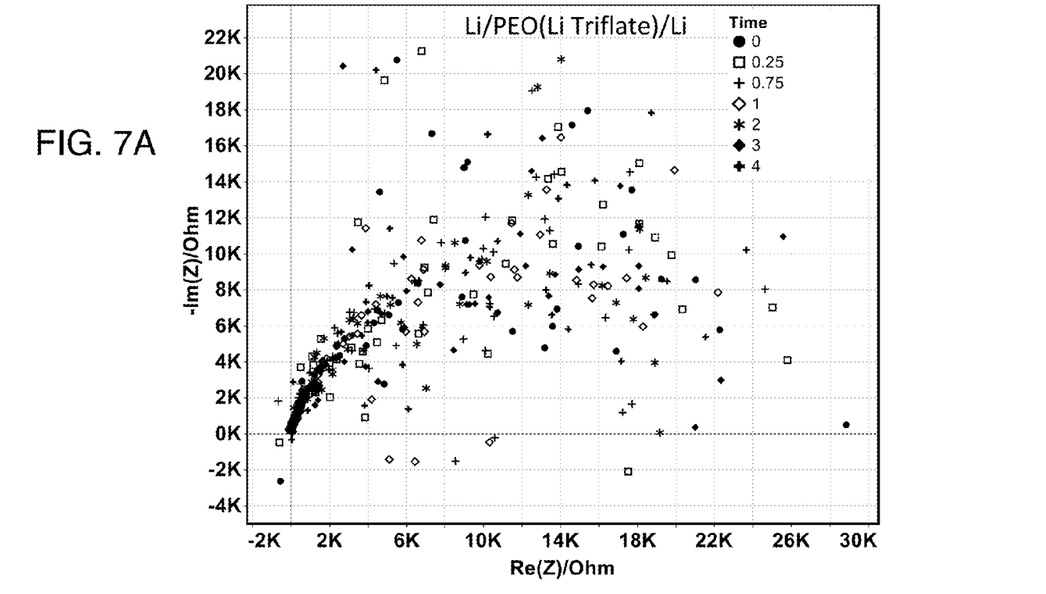
FIGS. 7A and 7B illustrate measurement of the time dependence of electrical impedance of films containing polymer/lithium salt formulations according to certain embodiments of the invention.
Figure 7B:
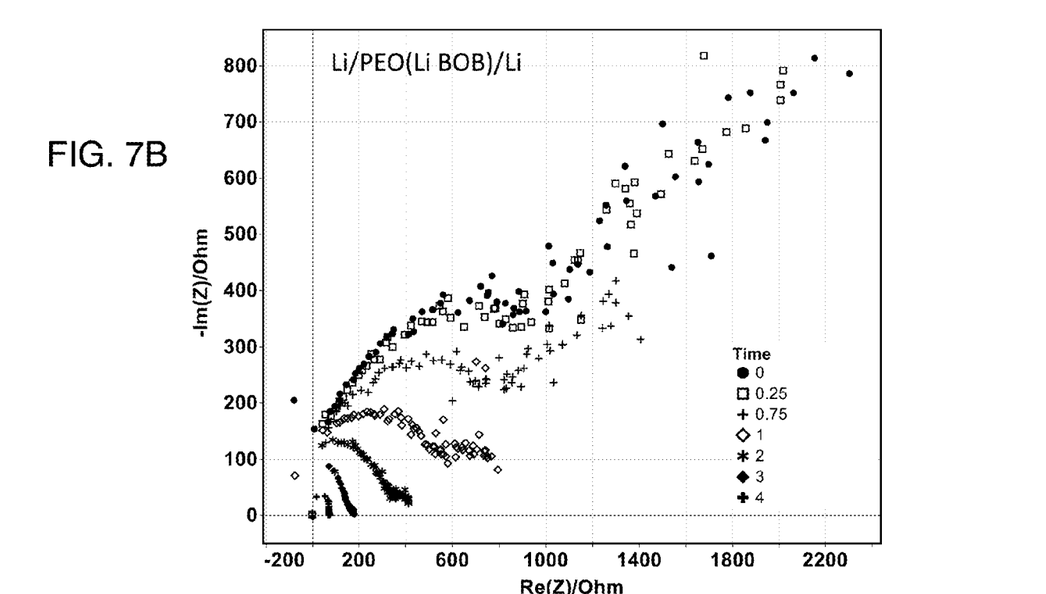

Electrochemical impedance spectroscopy is used to determine the time-dependence of the ionic conductivity of PEO/lithium salt films placed between lithium substrates. FIGS. 7A and 7B demonstrate that the interfacial impedance does not increase with time, indicating that a passivation film does not build up on the lithium metal due to reaction of the LiBOB with the lithium metal anode. Rather, the interfacial impedance decreases with time when LiBOB is used, in contrast to the lithium triflate control. Electrolyte formulations containing LiBOB are stable on the reductive lithium metal surface as measured by monitoring the impedance.

Example 6

Figure 8:
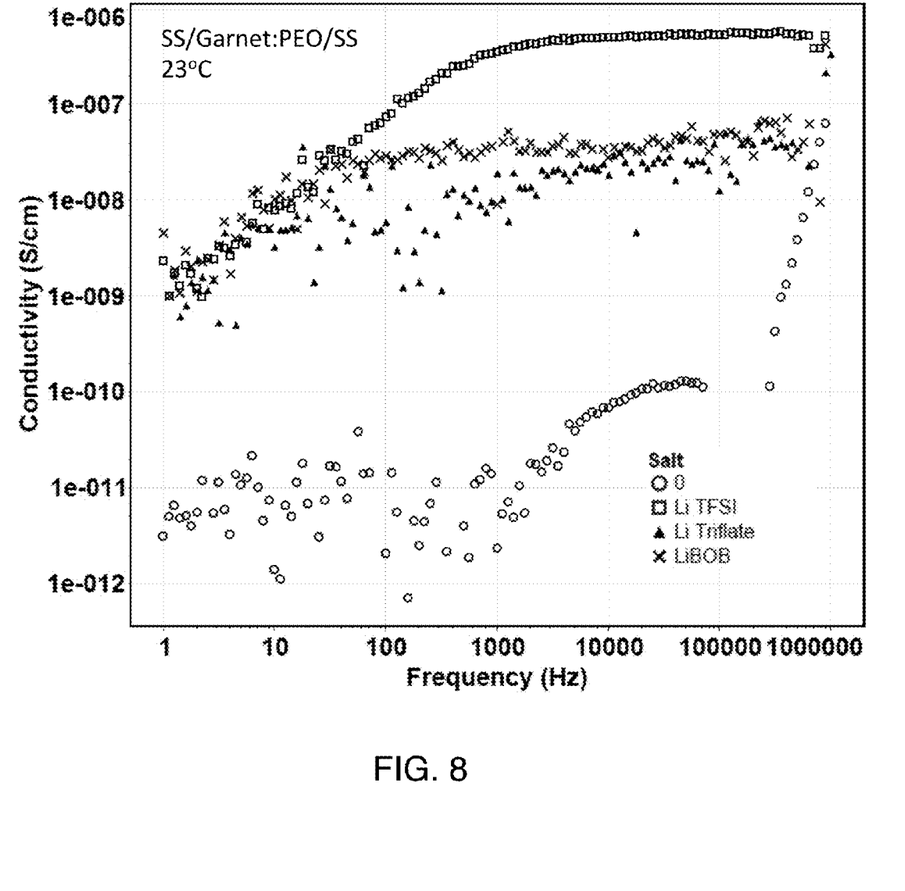
FIG. 8 illustrates measurement of the ionic conductivity of films containing ceramic/polymer/lithium salt formulations according to certain embodiments of the invention.

Electrochemical impedance spectroscopy is used to determine the ionic conductivity of LLZTO/PEO/lithium salt films placed between stainless steel disks. In composites with PEO, LLZTO, and lithium salts, incorporation of LiBOB or LiTFSI result in a surprising increase in ionic conductivity as shown in FIG. 8. LLZTO is a ceramic inclusion that acts as an intercalation compound and facilitates ionic conductivity. However, without the lithium salt additives in the film, the LLZTO is only somewhat effective. Surprisingly, the LiBOB and LiTFSI increased the effectiveness of the ceramic inclusion.

Without being bound to any particular hypothesis or mechanism of action, the addition of lithium salts (and LiBOB or LiTFSI in particular) may increase the presence of amorphous domains in the polymer. It is hypothesized that the softer amorphous domains (as compared to the harder crystalline domains) enable better lithium transport and also form better interfaces than the original (and less amorphous) polymer material. These better interfaces can be particularly effective in the presence of ceramic inclusions that are added to facilitate ionic conductions, such as garnet-type ceramic inclusions.

Certain embodiments disclosed herein demonstrate improved power performance as compared to control and the ability to achieve nearly theoretical capacity out of the cathode.

Certain embodiments disclosed herein demonstrate significantly lower impedance at the solid electrolyte/lithium metal anode interface and improved conductivity.

Certain embodiments disclosed herein facilitate lithium salt migration from a comparatively thick cathode and into a thin electrolyte, thereby increasing the lithium salt content in the electrolyte from an initial amount of as low as 0% in the solid electrolyte.

Certain embodiments disclosed herein demonstrate that the combination of using LiBOB and/or LiTFSI as an additive in both the cathode and electrolyte formulations enables high discharge capacities in an all solid-state battery.

Various embodiments of solid electrolyte formulations disclosed herein benefit from the discovery of the reduction of interfacial impedance between a conducting polymer (such as PEO) and a lithium-ion-intercalating ceramic inclusion (such as LLZTO). As compared to prior art formulations, the present formulations use ceramic inclusions that can transport and/or intercalate lithium rather than as non-conductive filler materials.

Notably, the formulations disclosed herein can be used in cathode formulations. Thus, the ceramic materials that intercalate lithium and the lithium salts that reduce interfacial impedance can be used with conducting polymers that act as binders when formulating cathode materials.

While the invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt a particular situation, material, composition of matter, method, or process to the objective, spirit and scope of the invention. All such modifications are intended to be within the scope of the claims appended hereto. In particular, while the methods disclosed herein have been described with reference to particular operations performed in a particular order, it will be understood that these operations may be combined, sub-divided, or re-ordered to form an equivalent method without departing from the teachings of the invention. Accordingly, unless specifically indicated herein, the order and grouping of the operations are not limitations of the invention.

We claim:

1. A lithium ion battery, comprising:
    an anode;
    a cathode comprising an electrode active material, a first lithium salt comprising at least 20% by weight of the total weight of the cathode of lithium bis(oxalato) borate ($LiB(C_2O_4)_2$), and an ion conducting polymer material; and
    a solid electrolyte substantially free of liquid plasticizer and comprising a second lithium salt comprising lithium triflate ($LiCF_3SO_3$).

2. The battery of claim 1, wherein the first lithium salt and the polymer material are arranged together in domains within the cathode, the electrode active material is arranged in domains within the cathode, interfaces are found where the domains of the first lithium salt and the ion conducting polymer material and the domains of the electrode active material meet, and the first lithium salt is found preferentially at the interfaces.

3. The battery of claim 1, wherein the ion conducting polymer material comprises poly(ethylene oxide).

4. The battery of claim 1, wherein the ion conducting polymer material comprises poly(ethylene glycol).

5. A lithium ion battery, comprising:
    an anode;
    a cathode comprising an electrode active material, a first lithium salt comprising at least 20% by weight of the total weight of the cathode of lithium bis(trifluoromethanesulfonyl)imide ($CF_3SO_2NLiSO_2CF_3$), and an ion conducting polymer material; and
    a solid electrolyte substantially free of liquid plasticizer and comprising a second lithium salt comprising lithium triflate ($LiCF_3SO_3$).

6. The battery of claim 5, wherein the first lithium salt and the polymer material are arranged together in domains within the cathode, the electrode active material is arranged in domains within the cathode, interfaces are found where the domains of the first lithium salt and the ion conducting polymer material and the domains of the electrode active material meet, and the first lithium salt is found preferentially at the interfaces.

7. The battery of claim 5, wherein the ion conducting polymer material comprises poly(ethylene oxide).

8. The battery of claim 5, wherein the ion conducting polymer material comprises poly(ethylene glycol).

* * * * *